United States Patent
Martinez de Salinas Vazquez et al.

(10) Patent No.: US 9,591,187 B2
(45) Date of Patent: Mar. 7, 2017

(54) IMAGE PROCESSING THAT INCLUDES REDUCING A NUMBER OF COLORS WITHIN A CELL OF AN IMAGE

(71) Applicants: HEWLETT-PACKARD DEVELOPMENT COMPANY, L P, Houston, TX (US); Jorge Martinez de Salinas Vazquez, Sunnyvale, CA (US); Lluis Abello Rosello, Tarragona (ES); Joan Vidal Fortia, Barcelona (ES); Noam Shaham, Mazkeret Batia (IL); Ram Dagan, Modiin (IL); Gideon Amir, Ness Ziona (IL)

(72) Inventors: Jorge Martinez de Salinas Vazquez, Sunnyvale, CA (US); Lluis Abello Rosello, Tarragona (ES); Joan Vidal Fortia, Barcelona (ES); Noam Shaham, Mazkeret Batia (IL); Ram Dagan, Modiin (IL); Gideon Amir, Ness Ziona (IL)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/888,039

(22) PCT Filed: Apr. 29, 2013

(86) PCT No.: PCT/EP2013/058862
§ 371 (c)(1),
(2) Date: Oct. 29, 2015

(87) PCT Pub. No.: WO2014/177172
PCT Pub. Date: Nov. 6, 2014

(65) Prior Publication Data
US 2016/0080612 A1    Mar. 17, 2016

(51) Int. Cl.
*H04N 1/60*    (2006.01)
*H04N 1/64*    (2006.01)
(Continued)

(52) U.S. Cl.
CPC ......... *H04N 1/644* (2013.01); *G06K 15/1878* (2013.01); *H04N 1/6008* (2013.01);
(Continued)

(58) Field of Classification Search
None
See application file for complete search history.

(56) References Cited

U.S. PATENT DOCUMENTS

| 5,029,105 A | 7/1991 | Coleman et al. |
| 6,765,695 B2 | 7/2004 | Chen et al. |

(Continued)

FOREIGN PATENT DOCUMENTS

EP    1798954    6/2007

OTHER PUBLICATIONS

PCT International Search Report and Written Opinion, Jan. 15, 2014, PCT Application No. PCT/EP2013/058862, European Patent Office, 15 pp.
(Continued)

*Primary Examiner* — Scott A Rogers
(74) *Attorney, Agent, or Firm* — HP Inc—Patent Department

(57) ABSTRACT

A color input image comprising a plurality of pixels, each pixels encoded in RGB color space, is processed to convert the RGB pixels to another color space domain for printing the color input image. The number of colors within a cell of the input image is reduced. Each cell comprises an N×M array of pixels and the number of colors is reduced to a maximum of b source colors, wherein b is a positive integer equal to or greater than 2. Each of the resulting colors of
(Continued)

each cell is calibrated to generate a printable color. The cells are then processed to convert the pixels of each cell into another color space, for example, to determine ink vectors, in another color space, for each calibrated color.

20 Claims, 4 Drawing Sheets

(51) Int. Cl.
*G06K 15/02* (2006.01)
*G06K 15/10* (2006.01)

(52) U.S. Cl.
CPC ......... *H04N 1/6016* (2013.01); *H04N 1/6019* (2013.01); *H04N 1/6058* (2013.01); *G06K 15/102* (2013.01)

(56) References Cited

U.S. PATENT DOCUMENTS

| | | | |
|---|---|---|---|
| 7,062,087 B1 | 6/2006 | Varga | |
| 7,379,207 B2* | 5/2008 | Harrington | H04N 1/6058 358/1.9 |
| 7,881,526 B2* | 2/2011 | Kawano | H04N 1/40062 358/2.1 |
| 7,940,434 B2* | 5/2011 | Inoue | H04N 1/6019 358/518 |
| 8,432,588 B2* | 4/2013 | Morovic | H04N 1/6058 358/518 |
| 8,553,301 B2* | 10/2013 | Tamura | H04N 1/644 358/518 |
| 9,232,113 B2* | 1/2016 | Miyanaga | H04N 1/6008 |
| 9,392,294 B2* | 7/2016 | Shaham | H04N 1/644 |
| 2012/0081385 A1 | 4/2012 | Cote et al. | |
| 2012/0236337 A1 | 9/2012 | Shimosato | |
| 2014/0029024 A1 | 1/2014 | Shaham et al. | |

OTHER PUBLICATIONS

Lamparter, Bernd et al. "eXtended color cell compression—A runtime-efficient compression scheme for software video." Multimedia: Advanced Teleservices and High-Speed Communication Architectures. Springer Berlin Heidelberg, 1994. 181-190.

Liou, Der-Ming et al. "A new microcomputer based imaging system with C 3 technique." Computer and Communication Systems, 1990. IEEE TENCON'90., 1990 IEEE Region 10 Conference on. IEEE, 1990.

Morovic, J, et al. "HANS: Controlling Ink-Jet Print Attributes Via Neugebauer Primary Area Coverages", IEEE transactions on image processing, IEEE service center, Feb. 1, 2012, vol. 21, No. 2, pp. 688-696 Piscataway, NJ, US.

Wong, et al. "Image processing for halftones." Signal Processing Magazine, IEEE Jul. 2003, vol. 20, No. 4, pp. 59-70.

Morovic et al., HANS Enabling CMY Metamers, ICC/HP Digital Print Day, Jun. 15, 2011 (18 pages).

Vondran, Gary L., Hewlett-Packard Laboratories—Cambridge, HPL-98-95, Radial and Pruned Tetrahedral Interpolation Techniques, Oct. 22, 2009 (32 pages).

\* cited by examiner

IMAGE PROCESSING THAT INCLUDES REDUCING A NUMBER OF COLORS WITHIN A CELL OF AN IMAGE

CROSS-REFERENCE TO RELATED APPLICATION

This application is a U.S. National Stage Application of and claims priority to International Patent Application No. PCT/EP2013/058862, filed on Apr. 29, 2013, and entitled "COLOR IMAGE PROCESSING," which is hereby incorporated by reference in its entirety.

BACKGROUND

All printers implement some data transformation that converts pixels in sRGB (or in any other color space) to drops on paper, and ultimately to printed objects of a given colorimetry. This transformation is done following a set of requirements intended to provide the desired image quality, printing speed or any other attribute.

This transformation is achieved by a plurality of pipeline stages which transform a continuous tone image (usually RBG, 24 bits per pixel) to a halftone image (usually CMYK).

BRIEF DESCRIPTION OF DRAWINGS

For a more complete understanding, reference is now made to the following description taken in conjunction with the accompanying drawings in which.

DETAILED DESCRIPTION

Figure 1:
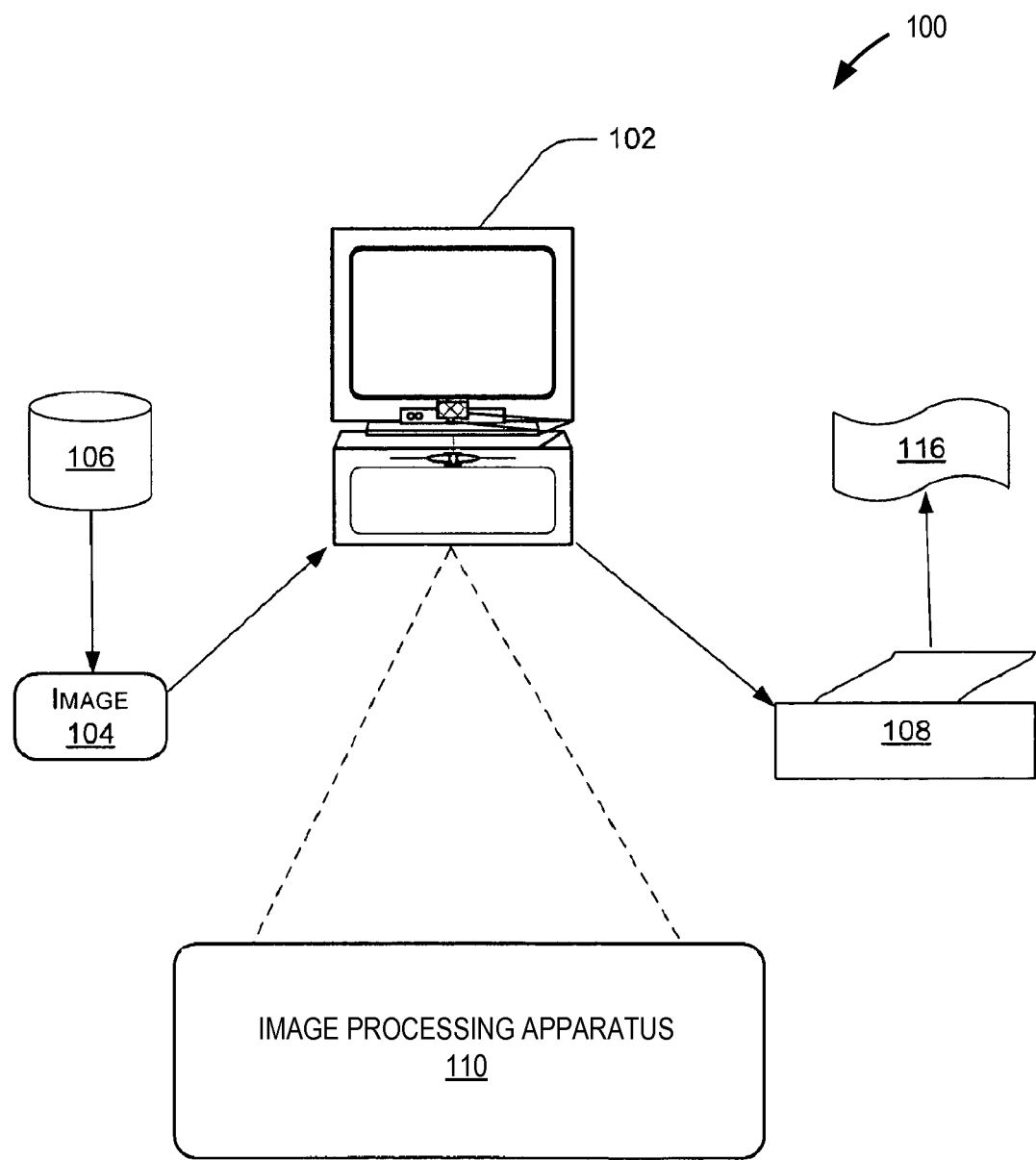
FIG. 1 is a simplified schematic diagram of a color printing system according to an example.

FIG. 1 illustrates an example of a printing system and image processing 100. Printing system 100 can be implemented, at least in part, by one or more suitable computing devices, such as computing device 102. Other computing devices that may be used include, but are not limited to, a personal computer, a laptop computer, a desktop computer, a digital camera, a personal digital assistance device, a cellular phone, a video player, and other types of image sources.

In one implementation, an image 104 is uploaded to the computing device 102 using input device 106. In other implementations, the image may be retrieved from a previously generated image set contained on a storage media, or retrieved from a remote storage location, such as an online application, using the Internet. Image 104 may be a still digital image created by a digital camera, a scanner, or the like. In other implementations the image may be a moving image such as a digital video. Image 104 may be sent to an output device such as printing device 108 by the computing device 102. Other printing devices that may be used include, but are not limited to, a dot-matrix printer, an inkjet printer, a laser printer, line printer, a solid ink printer, and a digital printer. In other implementations, the image may be displayed to a user on an output device 108 including, but not limited to, a TV set of various technologies (Cathode Ray Tube, Liquid Crystal Display, plasma), a computer display, a mobile phone display, a video projector, a multicolor Light Emitting Diode display, and the like.

In one implementation, the printing system 100 comprises image processing apparatus 110. The image processing apparatus 110 may be integral with the computing device 102 or the printing device 108. The image processing apparatus may utilise Halftone Area Neugebauer Separation (HANS) techniques to process the input image 104 into a printable format.

Figure 2:
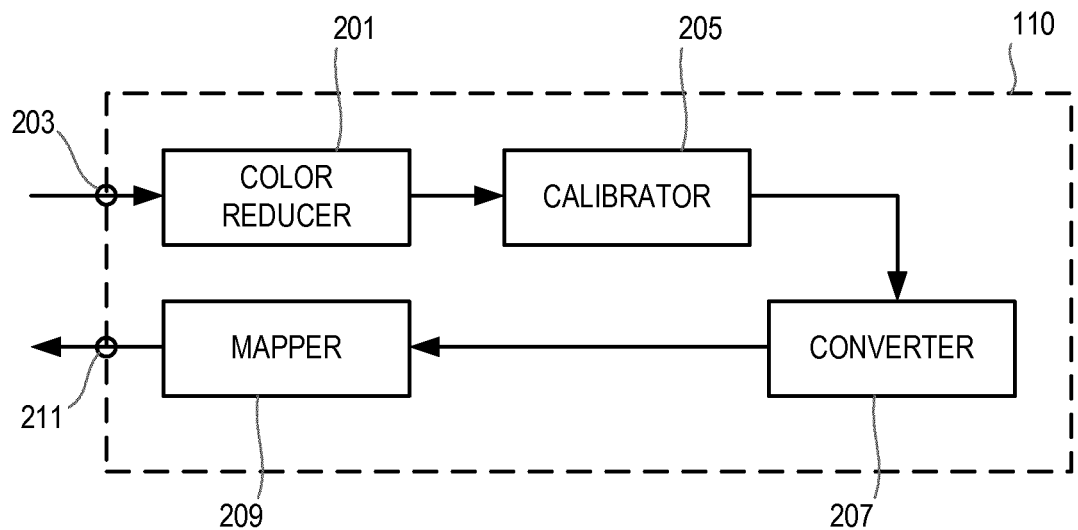
FIG. 2 is a simplified schematic diagram of an apparatus for processing a color image data according to one example.

The apparatus 110 for processing a color input image, as shown in FIG. 2, comprises a color reducer 201 having an input connected to an input terminal 203 of the apparatus 110. The output of the color reducer 201 is connected to a calibrator 205. The calibrator is connected to a converter 207 and the converter is connected to the input of a mapper 209. The output of the mapper 209 is connected to an output terminal 211.

Figure 3:
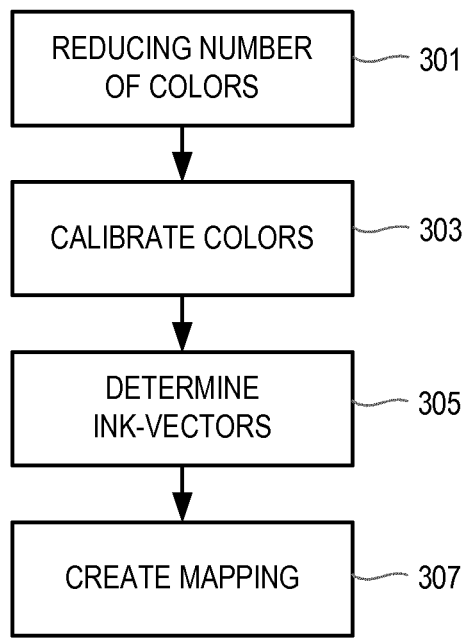
FIG. 3 is a flowchart of method of processing a color image data.

Operation of the apparatus 110 will now be described with reference to FIG. 3. The color reducer 201 receives a color input image 104 on the input terminal 203 of the apparatus 110. The color input image comprises a plurality of pixels, each pixel is encoded in RGB color space. The color reducer 201 is configured to reduce 301 the number of colors within a cell of the input image 104 to a maximum of at least 2 source colors. The number of colors in a cell may be reduced to any number of colors as required, for example, 4, 5, 6, 7 and 8 colors. In this example, it is assumed that the number of colors within a cell is reduced to a maximum of 2 colors. First, the input image 104 is divided into a plurality of substantially equal cells of N×M array of pixels, where N may equal M, for example, a 4×4 pixel array. If there 2 colors or less, the colors of the cell are maintained and encoded as they are. Each of the 2 colors of each cell is calibrated 303 by the calibrator 205. Next the calibrated colors are processed for converting the pixels of each cell into another color space domain for printing the input image, for example, linearization, color space conversion, and halftoning, such tone dependent halftoning. In the example, shown in FIG. 3, ink-vectors or NPacs, defined in the another color space, are determined 305 for each of the 2 source colors by the converter 207. Finally a mapping is created, 307, of each pixel of the N×M array according to the determined ink-vector/NPac by the mapper 209. The output of the mapper 209 on the output terminal 211 provides the color image for printing by the printer device 108. In an example, it outputs a halftone image for printing.

In more detail each of the stages of calibration 303, conversion 305 and mapping 307 of the RGB colors is carried out on an image data having a compressed format in which an N×M pixel cell is reduced into 2 RGB colors and a mask. This is illustrated, in an example, in FIGS. 4 and 5 with respect to a 4×4 pixel cell. Each pixel 401_1 to 401_16 of the cell is defined by respective Red 403_1 to 403_16, Green 405_1 to 405_16 and Blue 407_1 to 407_16 bytes. Therefore, for a continuous tone RGB image, each of these pixels need 3 bytes in order to be represented in RGB and therefore the bandwidth required to process contone pixels is very high.

Figure 4:
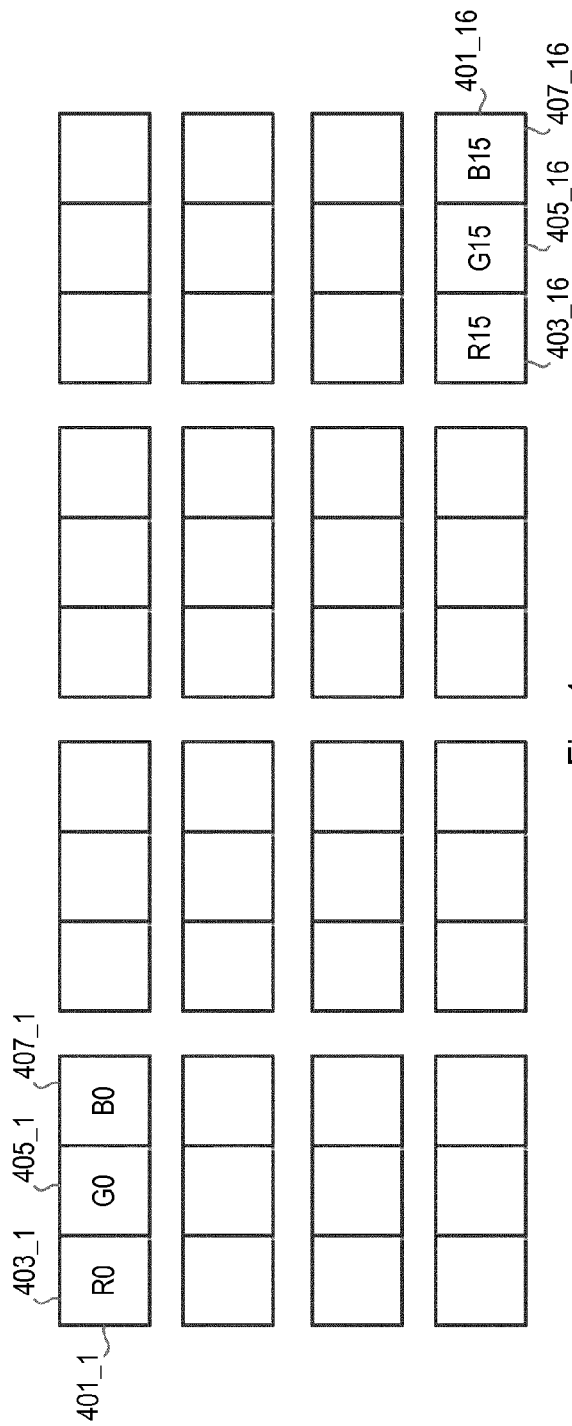
FIG. 4 is an illustration of an example of pixel cell of a color image in an uncompressed format.
Figure 5:
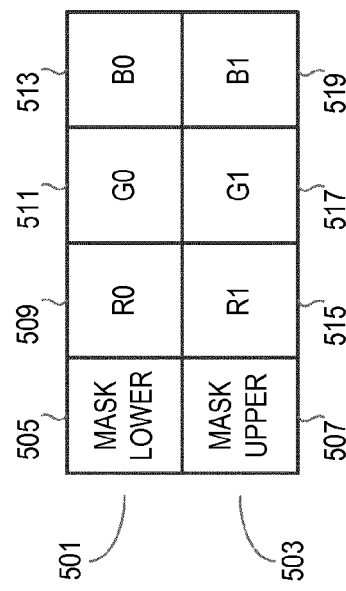
FIG. 5 is an illustration of the cell of FIG. 4 reduced to 2 colors.

In the example of FIG. 5, the number of different colors within the cell is determined. If the number of colors exceeds 2 colors, the number of colors is reduced, for example, using a technique known as color cell compression. The 4×4 pixel cell of FIG. 4 is then encoded by a mask 505, 507 of 1 bit for each of the 4×4 pixels indicating if that pixel is mapped to a first color 501 coded by the red, green and blue bytes 509, 511, 513, or to a second color 503 coded by the red, green and blue bytes 515, 517, 519. In this way the cell of 16 pixels of this example is encoded using only 8 bytes 505, 509, 511, 513, 507, 515, 517, 519 of FIG. 5 instead of 3 bytes for each of the 16 pixels.

The color calibration RGB to RGB is carried out by first dividing the RGB color space into, for example, 16 cubes for each dimension. The upper bits of the RGB pixels are used to select the cube for that pixel. Then the final output color is calculated performing tetrahedral interpolations within that cube. This step is performed only for each of the 2 colors in the N×M cell, requiring only 8 bytes of the example of FIG. 4 to be processed.

Next each reduced RGB color is represented as a collection of Neugebauers Primaries (NPs) and the probabilities associated to it. For example a purple color may be represented with 20% probability of White+30% probability of Cyan+20% probability of magenta+20% probability of CyanMagenta. NPacs are determined for each of the 2 colors of the N×M cell. This is achieved by dividing the NP space into a plurality of cubes (for example 16 cubes for each dimension). A cube for each color is selected based on the upper bits of the color. At least 4 vertices of the selected cube is selected. Tetrahedral interpolation of the selected vertices is performed. From this a set of NPacs is selected. A halftone matrix is applied to select an NPac from the set of NPacs for each of the 2 colors. This is very expensive computationally. This step is performed only for each of the 2 colors in the N×M cell, greatly reducing the computational effort.

The final mapping stage may comprise HANS halftoning. In one implementation, the NPacs utilize a set of equations referred to as the Neugebauer equations. Neugebauer equations are tools for characterizing color printing systems based upon halftoning techniques. The Neugebauer equations, are associated with colors referred to as the Neugebauer Primaries, which in a binary (bi-level) printing device, are the 2n combination of n inks, wherein the application of each of the n inks is at either 0% or 100% within an n-dimensional ink space. Generally, the number of Neugebauer Primaries (NPs) is $k^n$, where k is the number of levels at which an ink can be used and n is the number of inks. For example, for a printer comprising six different inks either 0, 1, or 2 drops of each ink may be specified at each halftone pixel, resulting in 36 or 729 Neugebauer Primaries (NPs).

The printing device 108 will direct the image 104 to be printed upon a substrate 116 as dictated by the image processing apparatus 110. The substrate 116 may include, without limitation, any variety of paper (lightweight, heavyweight, coated, uncoated, paperboard, cardboard, etc.), films, foils, textiles, fabrics, or plastics.

It should be noted that while printing system 100 is described in the context of image processing in a computing environment, it is to be appreciated and understood that it can be employed in other contexts and environments involving other types of data processing without departing from the spirit and scope of the claimed subject matter.

Figure 6:
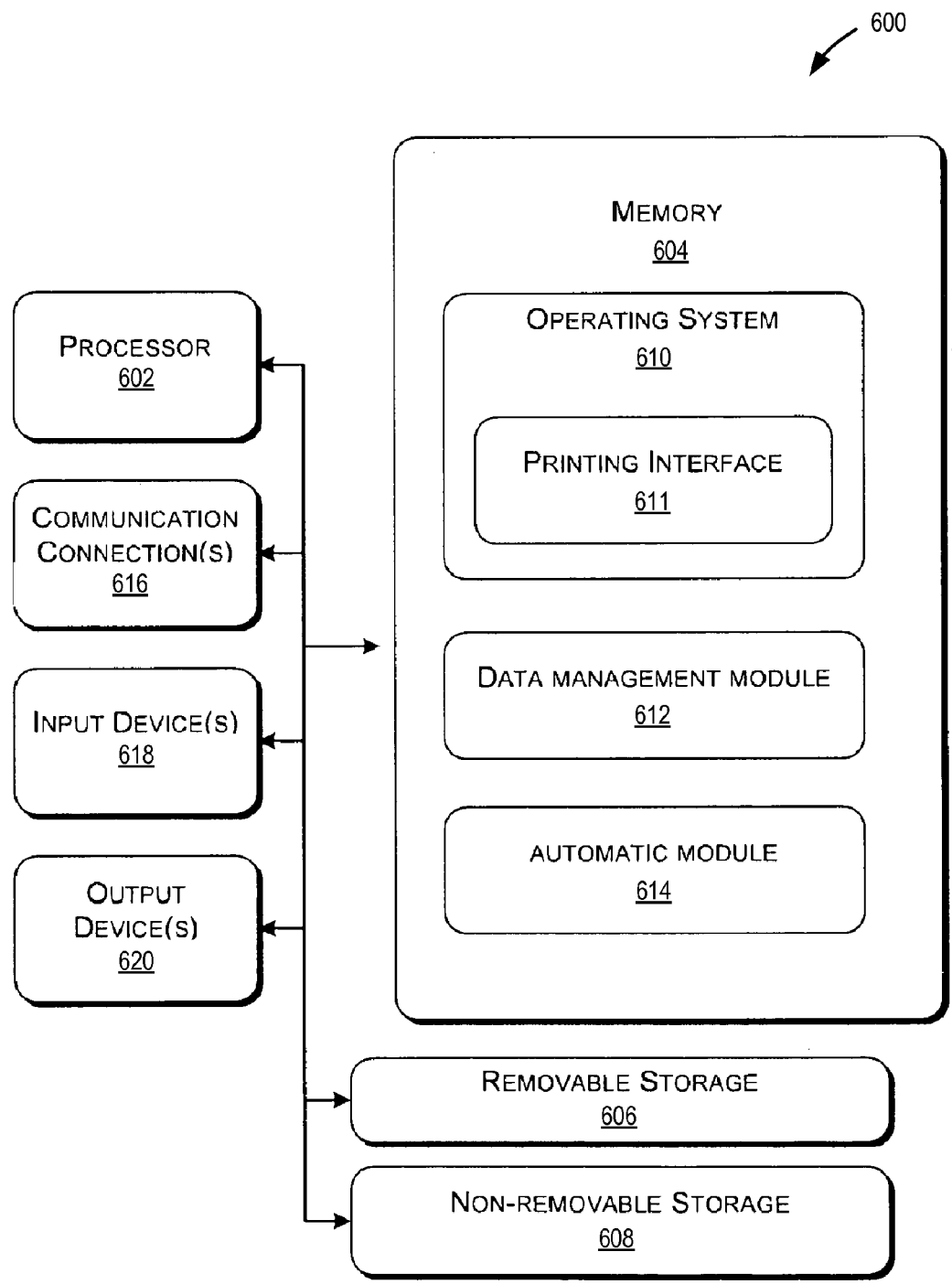
FIG. 6 is a block diagram of an example of a computing environment according to the printing system of FIG. 1.

FIG. 6 is a schematic block diagram of an exemplary general operating system 600. The system 600 may be configured as any suitable system capable of implementing interactive user interface 110 and associated color processes. In one exemplary configuration, the system comprises at least one processor 602 and a memory 604. The processor 602 may be implemented as appropriate in hardware, software, firmware, or combinations thereof. Software or firmware implementations of the processor 602 may include computer- or machine-executable instructions written in any suitable programming language to perform the various functions described.

Memory 604 may store programs of instructions that are loadable and executable on the processor 602, as well as data generated during the execution of these programs.

Depending on the configuration and type of computing device, memory 604 may be volatile (such as RAM) and/or non-volatile (such as ROM, flash memory, etc.). The system may also include additional removable storage 506 and/or non-removable storage 608 including, but not limited to, magnetic storage, optical disks, and/or tape storage. The disk drives and their associated computer-readable medium may provide non-volatile storage of computer readable instructions, data structures, program modules, and other data for the communication devices.

Memory 604, removable storage 606, and non-removable storage 608 are all examples of the computer storage medium. Additional types of computer storage medium that may be present include, but are not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the computing device 102.

Turning to the contents of the memory 604 in more detail, may include an operating system 610 for the image processing apparatus. For example, the system 600 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 604 includes the printing interface 110*a* data management module 612, and an automatic module 614. The data management module 612 stores and manages storage of information, such as images, ROI, equations, and the like, and may communicate with one or more local and/or remote databases or services. The automatic module 614 allows the process to operate without human intervention.

The system 600 may also contain communications connection(s) 616 that allow processor 602 to communicate with servers, the user terminals, and/or other devices on a network. Communications connection(s) 616 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 600 may also include input device(s) 618 such as a keyboard, mouse, pen, voice input device, touch input device, etc., and output device(s) 620, such as a display, speakers, printer, etc. The system 600 may include a database hosted on the processor 602. All these devices are well known in the art and need not be discussed at length here.

The calibration and conversion stages 303, 305 are performed using the compressed RGB Format i.e. the processes are performed for the 2 colors of the cell. As a result, pixels can be processed 8 times faster for processing 2 RGB pixels instead of 16 for a 4×4 cell.

Given that that 80% of the work is performed 8 times faster, using Amdahl's law the total speed up is as follows:

$$totalspeedup = \frac{1}{(1-p)+\frac{p}{s}} = \frac{1}{(1-.08)+0.8/8} = 3.33$$

wherein p is the percentage of work done with the compressed format (reduced colors) RGB optimization, 80% in the example above, s is the speedup of the optimized part, 8 times in the example above.

This reduces the system bandwidth, provides very efficient, high throughput in the stages of image processing, running almost 4 times faster. The cost of components of the image processor is reduced as smaller FPGA, cheapest GPU/CPU can be utilised.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. The features of any dependent claim may be combined with the features of any of the independent claims or other dependent claims.

The invention claimed is:

1. A method comprising:
   dividing, by a system comprising a processor, an input image into a plurality of cells, each cell of the plurality of cells comprising an array of pixels;
   determining, by the system, a number of colors in each cell of the plurality of cells;
   in response to determining that the number of colors in each cell of the plurality of cells is greater than b, where b is a positive integer equal to or greater than 2:
      reducing, by the system, a number of colors within each cell of the plurality of cells, to b source colors;
      calibrating, by the system, each of the b source colors of each cell of the plurality of cells to generate a respective printable color;
      processing, by the system, the printable colors produced by the calibrating for converting the pixels of each cell of the plurality of cells into another color space domain; and
      producing, by the system based on the processing, an output image that is provided to a printing device for printing.

2. The method according to claim 1, wherein each pixel of a plurality of pixels of the input image is encoded in an RGB color space, and wherein the calibrating comprises:
   dividing the RGB color space into a plurality of cubes;
   for each respective source color of the b source colors in each cell, selecting, from among the plurality of cubes, a cube containing the respective source color;
   calculating a location of the respective source color in each cell within the selected cube, the calculated location locating the respective printable color.

3. The method according to claim 2, wherein the calculating of the location of the respective source color within the selected cube comprises:
   performing tetrahedral interpolations within the selected cube for each source color of the b source colors.

4. The method according to claim 2, wherein the processing comprises determining an ink-vector, in the another color space domain, of each printable color produced by the calibrating, and wherein the determining the ink-vector of each printable color comprises:
   selecting at least 4 vertices of the selected cube and their corresponding ink-vectors;
   interpolating the at least 4 ink-vectors to generate a set of ink-vectors; and
   applying a halftone matrix to the set of ink-vectors to select a single ink-vector from the set of ink-vectors.

5. The method according to claim 1, wherein the processing comprises:
   determining an ink-vector, in the another color space domain, of each printable color produced by the calibrating.

6. The method according to claim 5, further comprising:
   creating a mapping for each pixel of each cell of the plurality of cells according to the determined ink-vector.

7. The method according to claim 1, wherein the processing comprises halftoning.

8. The method according to claim 1, further comprising:
   in response to determining that the number of colors in each cell of the plurality of cells is not greater than b:
      calibrating, without reducing the number of colors in each cell of the plurality of cells, each of the colors in each cell of the plurality of cells to generate a respective printable color; and
      processing the printable colors produced by the calibrating without reducing the number of colors in each cell for converting the pixels of each cell into the another color space domain.

9. The method according to claim 1, wherein the reducing comprises mapping each pixel of the array of pixels within each respective cell of the plurality of cells, to a respective source color of the b source colors, the mapping performed using a mask including indicators for respective pixels of the respective cell, each indicator of the indicators selectively settable to a first value to map a respective pixel to a first source color of the b source colors, and settable to a second value to map a respective pixel to a second source color of the b source colors.

10. The method according to claim 9, wherein the indicators comprise bits of the mask.

11. The method according to claim 1, wherein the input image is encoded in an RGB domain, and the b source colors comprise b RGB colors.

12. A method of a printing device, comprising:
   determining a number of colors in each cell of a plurality of cells of an input image, each cell of the plurality of cells comprising an array of pixels;
   in response to determining that the number of colors in each cell of the plurality of cells is greater than a specified number that is a positive integer equal to or greater than 2, reducing the number of colors within each cell of the plurality of cells to the specified number of colors;
   in response to determining that the number of colors in each cell of the plurality of cells is not greater than the specified number, skipping the reducing to maintain the colors of each cell of the plurality of cells;
   calibrating each of the colors of each cell of the plurality of cells;
   determining Neugebauer Primaries to represent each of the colors of each cell of the plurality of cells;

creating a mapping of each pixel of each cell of the plurality of cells according to the determined Neugebauer Primaries; and printing the input image based on the mappings.

13. A computer comprising:
a processor;
a non-transitory storage medium storing instructions executable on the processor to:
determine a number of colors in each cell of a plurality of cells of an input image, each cell of the plurality of cells comprising an array of pixels;
in response to determining that the number of colors in each cell of the plurality of cells is greater than a specified number that is a positive integer equal to or greater than 2, reduce the number of colors within each cell of the plurality of cells to the specified number of colors;
in response to determining that the number of colors in each cell of the plurality of cells is not greater than the specified number, skip the reducing to maintain the colors of each cell of the plurality of cells;
calibrate each of the colors of each cell;
process the calibrated colors for converting the pixels of each cell into another color space domain; and
produce, based on the processing, an output image that is provided to a printing device for printing.

14. The computer according to claim 13, wherein the processing of the calibrated colors comprises:
determining an ink-vector, in the another color space domain, for each calibrated color.

15. The computer according to claim 14, wherein the instructions are executable on the processor to:
map each pixel of each cell of the plurality of cells according to the determined ink-vectors.

16. The computer according to claim 13, wherein the reducing comprises mapping each pixel of the array of pixels within each respective cell of the plurality of cells, to a respective color of the specified number of colors, the mapping performed using a mask including indicators for respective pixels of the respective cell, each indicator of the indicators selectively settable to a first value to map a respective pixel to a first color of the specified number of colors, and settable to a second value to map a respective pixel to a second source color of the specified number of colors.

17. A printing system comprising:
an image processing apparatus, the image processing apparatus comprising:
a processor;
a non-transitory storage medium storing instructions executable on the processor to:
determine a number of colors in each cell of a plurality of cells of an input image, each cell of the plurality of cells comprising an array of pixels;
in response to determining that the number of colors in each cell of the plurality of cells is greater than a specified number that is a positive integer equal to or greater than 2, reduce the number of colors within each cell of the plurality of cells to the specified number of colors;
calibrate each color of the specified number of colors of each cell of the plurality of cells;
determine an ink-vector, in another color space, for each calibrated color; and
create a mapping of each pixel of each cell of the plurality of cells according to the determined ink-vectors; and
a printing device to print the input image based on the mappings.

18. The printing system according to claim 17, wherein the instructions are executable on the processor to:
in response to determining that the number of colors in each cell of the plurality of cells is not greater than the specified number:
calibrating, without reducing the number of colors in each cell of the plurality of cells, each of the colors in each cell of the plurality of cells to generate a respective printable color; and
processing the printable colors produced by the calibrating without reducing the number of colors in each cell for converting the pixels of each cell into the another color space.

19. The printing system according to claim 17, wherein the reducing comprises mapping each pixel of the array of pixels within each respective cell of the plurality of cells, to a respective color of the specified number of colors, the mapping performed using a mask including indicators for respective pixels of the respective cell, each indicator of the indicators selectively settable to a first value to map a respective pixel to a first color of the specified number of colors, and settable to a second value to map a respective pixel to a second source color of the specified number of colors.

20. A non-transitory computer-readable storage medium comprising instructions stored thereon, the instructions upon execution causing a system to:
determine a number of colors in each cell of a plurality of cells of an input image, each cell of the plurality of cells comprising an array of pixels;
in response to determining that the number of colors in each cell of the plurality of cells is greater than a specified number that is a positive integer equal to or greater than 2, reduce the number of colors within each cell of the plurality of cells to the specified number of colors;
in response to determining that the number of colors in each cell of the plurality of cells is not greater than the specified number, skip the reducing to maintain the colors of each cell of the plurality of cells;
calibrate each of the colors of each cell to generate a respective printable color;
process the printable colors produced by the calibrating for converting the pixels of each cell of the plurality of cells into another color space domain
produce, based on the processing, an output image that is provided to a printing device for printing.

* * * * *

UNITED STATES PATENT AND TRADEMARK OFFICE
CERTIFICATE OF CORRECTION

PATENT NO. : 9,591,187 B2
APPLICATION NO. : 14/888039
DATED : March 7, 2017
INVENTOR(S) : Jorge Martinez de Salinas Vazquez et al.

It is certified that error appears in the above-identified patent and that said Letters Patent is hereby corrected as shown below:

On the Title Page

In item (71), Applicant, in Column 1, Line 3, after "Houston, TX (US);" delete "Jorge Martinez de Salinas Vazquez, Sunnyvale, CA (US); Lluis Abello Rosello, Tarragona (ES); Joan Vidal Fortia, Barcelona (US); Noam Shaham, Mazkeret Batia (IL); Ram Dagan, Modiin (IL); Gideon Amir, Ness Ziona (IL)".

In item (72), Inventor, in Column 1, Line 5, delete "Mazkeret Batia" and insert -- Mazkeret Batya --, therefor.

Signed and Sealed this
Seventeenth Day of July, 2018

Andrei Iancu
*Director of the United States Patent and Trademark Office*